(12) United States Patent
Brock et al.

(10) Patent No.: US 8,572,123 B2
(45) Date of Patent: Oct. 29, 2013

(54) DATABASE SYSTEM, PARTICULARLY FOR MULTIMEDIA OBJECTS

(75) Inventors: Anthony Paul Brock, Cape Town (ZA); Max Hoat, London (GB); Gregory Kenneth Willis, Sydney (AU)

(73) Assignee: Knapp Investment Company Limited, Road Town (VG)

( * ) Notice: Subject to any disclaimer, the term of this patent is extended or adjusted under 35 U.S.C. 154(b) by 1784 days.

(21) Appl. No.: 11/475,603

(22) Filed: Jun. 27, 2006

(65) Prior Publication Data

US 2008/0021926 A1   Jan. 24, 2008

Related U.S. Application Data

(63) Continuation of application No. 10/311,903, filed as application No. PCT/GB01/02857 on Jun. 27, 2001, now Pat. No. 7,096,226.

(30) Foreign Application Priority Data

Jun. 28, 2000 (GB) .................................. 0015896.4

(51) Int. Cl.
    *G06F 17/30* (2006.01)

(52) U.S. Cl.
    USPC ........................................................ 707/792

(58) Field of Classification Search
    USPC .................................. 700/100; 707/100, 792
    See application file for complete search history.

(56) References Cited

U.S. PATENT DOCUMENTS

| | | | | |
|---|---|---|---|---|
| 6,026,408 A | * | 2/2000 | Srinivasan et al. | 707/103 R |
| 2002/0069218 A1 | * | 6/2002 | Sull et al. | 707/501.1 |

* cited by examiner

*Primary Examiner* — Amresh Singh
(74) *Attorney, Agent, or Firm* — Anova Law Group, PLLC (57) ABSTRACT

A database system stores data relating to media objects and includes a meta table, a supplementary meta table, a content table, a supplementary content table, each supplementary content data record being linked to a supplementary metadata record and to a content data record. An object type link table links together records in the meta table, and a content data link table links together records in the content data table. An information retrieval system analyzes the tables and provides, for a selected instance of an object, information about that object's attributes and relationships with other objects in a hierarchical form.

24 Claims, 8 Drawing Sheets

DATABASE SYSTEM, PARTICULARLY FOR MULTIMEDIA OBJECTS

CROSS-REFERENCE TO RELATED APPLICATIONS

The present application is a continuation of U.S. patent application Ser. No. 10/311,903 filed on Feb. 13, 2003, now U.S. Pat. No. 7,096,226, issued Aug. 22, 2006, which is a US national stage application of International PCT Application No. PCT/GB01/02857, filed Jun. 27, 2001, which claims priority to GB Application No. 0015896.4, filed Jun. 28, 2000, the contents of which are hereby incorporated by reference.

FIELD OF THE INVENTION

The present invention relates to a database system which is particularly useful in the field of storing and managing multimedia objects.

SUMMARY OF THE INVENTION

The present invention, in one embodiment, relates to a database system which is particularly useful in the field of storing and managing multimedia objects such as text, sounds and images for use in multimedia presentations. However, the principles of the invention are applicable to other environments in which a database system is required. The invention is particularly concerned with a simple and extendible system for storing data objects without frequently changing the database structure by adding new tables or modifying table structures.

The media industry faces ever increasing challenges, such as the desirability of providing a solution for the convergence of a broadband rich media internet experience and live television production and delivery, the internet demands of real-time news, video on demand, user personalization, and continuing creative additions to initial systems. Delivery of interactive media, which describe real events in the real world in real-time, requires the ability to quickly acquire, store, edit, and composite live and other descriptive media by a large team of editors, artists, and producers. The data infrastructure necessary to address these and other related demands should satisfy various requirements. Means should be provided to describe any media or other data item. This encapsulation, or object, must provide opportunities to include attributes such as rights, versioning, attachment to composite objects, and any other descriptive characterization of itself and related data and processes. The system should be flexible and able to adapt to rapid changes, and should be able to scale sufficiently to support the vast requirements of a media rich world.

Viewed from one aspect, the present invention provides a database system which stores data relating to media objects for use in media presentations, the database system including a table containing metadata records specifying object types including hierarchical organisation object types and media object types, and the database also including a table containing content data records, each content data record being linked to a metadata record and containing at least one value for a parameter applicable to a specific instance of the object type specified in the linked metadata record.

Preferably, the database system in accordance with the invention includes a primary metadata table containing metadata records and a supplementary metadata table containing supplementary metadata records, each supplementary metadata record being linked to a metadata record and specifying an additional attribute for the object type specified in the linked metadata record, and the database further includes a primary content data table containing content data records and a supplementary content data table containing supplementary content data records, each supplementary content data record being linked to a supplementary metadata record and to a content data record, the content data record being linked to the metadata record as a specific instance of the object type defined in the metadata record, and wherein the supplementary content data record contains a value for the additional attribute specified in the linked supplementary metadata data record which is applicable to the specific instance of the object type specified in the linked metadata record.

Preferably, in the database system in accordance with the invention, links may be established between metadata records and preferably links may be established between content data records.

Such a system makes it possible to model an organization's aggregate information such that it can be fully described in a flexible, extendible and scalable manner. The system makes it possible to establish one or more distinct hierarchies, each of which represents a recursive decomposition of the organization's abstract information model. This decomposition provides the opportunity to reduce the information model to its smallest parts. Each of these parts can then be fully described in terms of content and the relationship with other parts in the hierarchy.

In essence the database schema is such that the metadata records describe an organization's information model, and the data records hold the actual data content itself. The metadata records define objects that are concerned with the hierarchical organization of the data, i.e. categories such as subjects (sports, news, entertainment) and stories within those subjects. The metadata records also define objects that will be used for the stories, such as text, images, audio and video. The content data records define specific instances of these objects. Supplementary metadata records enable additional attributes of an object to be defined, and supplementary content data records enable values to be stored for specific instances of the object.

Changes to the system can be made by making changes to the metadata and supplementary metadata records. There is no need to modify the basic table structure, and so changes can be implemented quickly and easily without interrupting use of the system.

Whilst the system is of particular use in managing media objects, it can be used in other environments. It can be used for general office, staff and customer management in a media organisation or in any other type of organisation, and could be adapted for specialist applications such as keeping records of patents and trademarks in an attorney's office.

The database system of the present invention can be operated on data processing means such as a server running a database engine such as Microsoft's SQL Server (trademarks) under a server operating system such as Microsoft's Windows NT or 2000 (trademarks).

Viewed from another aspect, the present invention provides a database system for storing information relating to a number of objects of various object types, comprising: a first metadata table containing records, each first metadata table record specifying an available object type and defining a set of attributes relevant to the object type; a first content table containing records, each first content table record being linked to a record in the first metadata table and containing data pertaining to an object which is a specific instance of the object type specified in the linked record in the first metadata table, the data including a value for at least one attribute defined in the linked record in the first metadata table; a second metadata table containing records, each second metadata table record being linked to a record in the first metadata table and defining an additional attribute relevant to the object type specified in the linked record in the first metadata table; and a second content table containing records, each second content table record being linked to a record in the first content table and to a record in the second metadata table and containing a data value for the additional attribute defined in the linked record in the second metadata table which applies to the specific instance of the object in the linked record in the first content table.

Viewed from another aspect, the present invention provides a method for acquiring and storing media objects and for making the media objects available from a hierarchical structure for use in media presentations, comprising the steps of: establishing a database for storing information relating to a number of objects of various object types, the database comprising a first metadata table, a first content table, a second metadata table and a second content table; entering into the first metadata table object type records, each specifying an object type and defining at least one attribute relevant to the object type; in respect of at least one object type record in the first metadata table, entering into the second metadata table a record linked to the object type record and defining an additional attribute relevant to the object type specified in the linked record in the first metadata table; acquiring data relating to media objects, each of which is a specific instance of an object type specified in the linked record in the first metadata table; in respect of each media object entering into the first content table a record linked to the associated object type record in the first metadata table and containing data pertaining to the media object, the data including a value for at least one attribute defined in the linked record in the first metadata table; and in respect of at least one media object entering into the second content table a record linked to the media object record in the first content table and to the associated object type record in the second metadata table and containing a data value for the additional attribute defined in the linked record in the second metadata table which applies to the media object in the linked record in the first content table; the method including the further step of providing an information retrieval system running on data processing means which analyses the first metadata table, the first content data table, the second metadata table and the second content data table, and provides, for a selected instance of an object, information about that object's attributes and relationships with other objects in a hierarchical form.

In order to use the system described above there should preferably be an interface which can analyse the first metadata table, the first content table, the second metadata table and the second content table and provide, for a selected object in the first metadata table, information about attributes specified in the first and second metadata table for the object type of which the selected object is a specific instance, and values for those attributes which are stored in the first and second content tables and are associated with the selected object.

In a practical arrangement there would be an application program interface (API) that manages the database and provides an efficient and simple way of accessing objects by abstracting the complexity of the schema There would preferably be a database tool for use by administrators to define and update metadata, including object types, attributes and rules. There would preferably be a back end application to maintain the actual data content, such as instances of objects, their attributes and relationships. There would also be a front end application for disseminating data to a user, for example by means of a web site.

A database system in accordance with the invention enables complex systems to be created for handling media objects. Thus, there can be provided a system for managing components of a media presentation, comprising the steps of storing a component in a plurality of formats, using the database system to establish an object representative of the component and establishing a link between the object and the stored plurality of formats, making the object available for selection to be included in the presentation, and enabling selection of at least one of the plurality of formats when the object is to be used in the presentation. Thus, a video clip for example could be stored as an MPEG file, as a streaming video file, or as a tape having a physical storage location for example, and the system will link the three objects to the video clip object. Such a system for handling objects in different formats is inventive in its own right and can be implemented with other, conventional database systems.

The system makes it possible to acquire material from many different sources and to create a large database of objects available rapidly to designers of different presentations, whether they are television broadcasts, web broadcasts, web pages, or hard copy publications. Handing material in a system intended to enable the rapid deployment of text and images creates various problems. One of these is the need to obtain copyright clearance or other permissions. Material may be obtained from many different sources, such as commercial suppliers of images or of material for broadcast, news agencies, web sites of other parties, newspapers, and so forth. Thus the present invention can be used to provide a system for managing components for inclusion in media presentations, in which a component is acquired and stored, an entry identifying the component is made in the database system, the entry including information indicating whether permission has been granted for use of the component, and inclusion of the component in a presentation is inhibited until the entry in the database indicates that permission has been granted. Such a system for tracking permissions is inventive in its own right and can be implemented with other, conventional database systems.

In some cases, the component will not be made available to a designer until permission has been obtained. In others, the designer may be able to identify the nature of the component, but will not be able to include it in presentations until permission has been obtained. In others, the component may be available for inclusion in the presentation at the design stage, but the presentation may not be published until permission has be obtained.

The system may be combined with other aspects of the invention, so that the component may be stored in various formats and presented as an object. The system may be such that a component cannot be converted into additional formats until permission has been obtained.

In a development of the system for recording permissions, the database system may store information relating to the source of the component such as a picture library, news agency and so forth. The system may also store information about permission when received, such as a time limit, or the number of times that the component may be used, or the various formats allowable, or the type of publications in which the component may be used. These developments will make it easier to control the use of large amounts of material acquired on a world wide basis.

In another development, there may be arrangements set up to produce an automatic request for permission by e-mail, fax or any other means if it is desired to use a component. This could, for example, be prompted by a designer selecting an object that it is desired to include in a publication. There may also be a system for a supplier of components to respond to a request so that permission is automatically recorded, and even any management or financial matters dealt with.

The versatility of the database system in accordance with the invention is such that it can be used in contexts other than the production of media presentations as such, including tracking copyrights as explained above, and other administrative functions.

Other aspects of the present invention include a computer software product containing instructions which when carried out on data processing apparatus will create a database system as set out above; an information retrieval system for use with the database system, the information retrieval system having components arranged to analyse the first metadata table, the first content table, the second metadata table and the second content table as set out above; a computer software product containing instructions which when carried out on data processing apparatus will create such an information retrieval system for displaying in a hierarchical structure information relating to objects; a method of creating a media presentation by assembling objects stored in the database system; and a media presentation so created.

The database system may be held on a single server on a plurality of servers which may be at the same or different locations. Client software for use in accessing the system may be provided in any suitable form, for example on physical media such as a disk or tape, or as signals provided from a remote location, for example over a network such as the Internet. The software may be in a form ready for use or in an encoded or compressed form. The client software may be run locally on a client console such as a personal computer or may be run on a remote application server. In a preferred arrangement, software for use in accessing the database is run on a remote application server to which users can be connected using browser technology over the Internet or over a private network.

BRIEF DESCRIPTION OF THE DRAWINGS

Some embodiments of the invention will now be described by way of example and with reference to the accompanying drawings, in which.

DETAILED DESCRIPTION OF THE INVENTION

Figure 1:
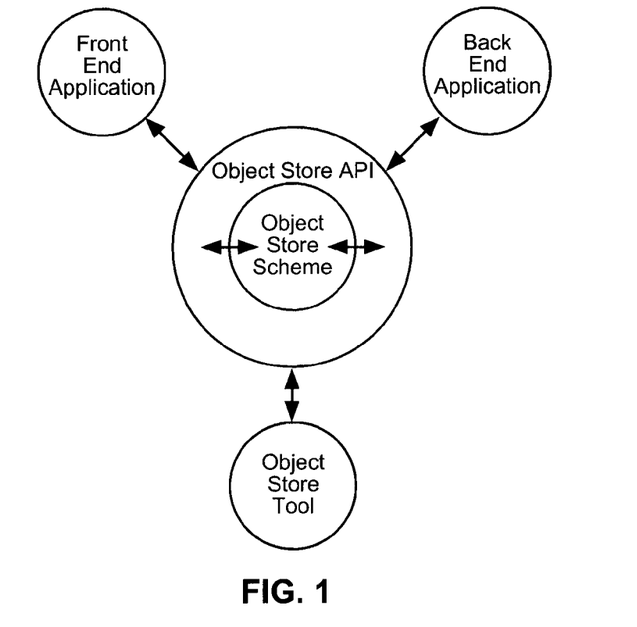
FIG. 1 is a schematic overview of a database system in accordance with the invention.

With reference to FIG. 1, the heart of the system in accordance with the invention is a database which is referred to as the "Object Store". The Object Store consists of a database as defined in an Object Store Schema, which supports the various applications that interface with it, through an Object Store Application Program Interface (API). These components are shown in FIG. 1 and comprise Front End Applications, Back End Applications and an Object Store Tool.

Figure 2:
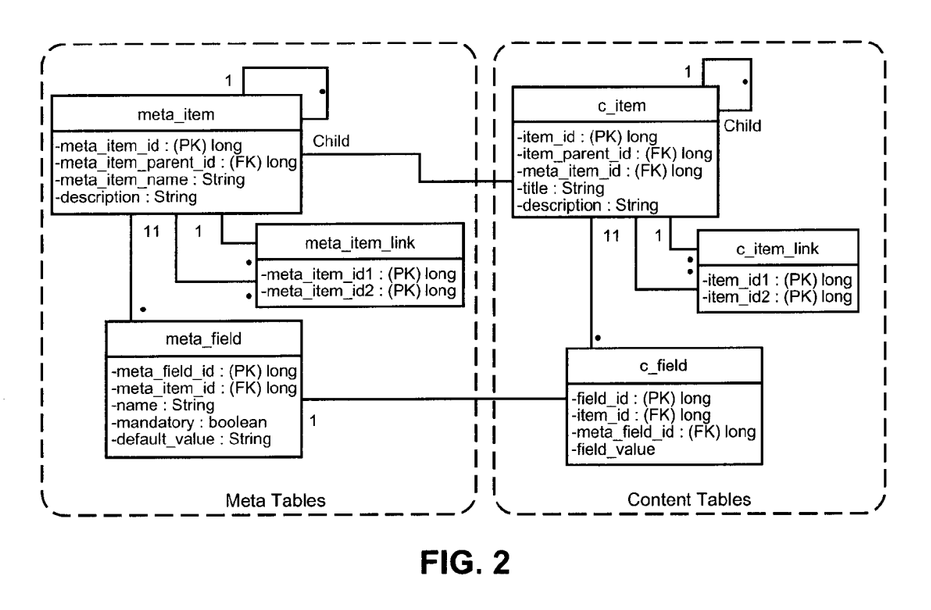
FIG. 2 is a conceptual class diagram of some core components of the database.

The Object Store schema is a unique object-relational schema that is defined over a traditional relational database. The Object Store schema consists of two main sets of tables, namely tables that describe the organization's information model (meta tables), and tables that hold the actual information content itself (content tables). FIG. 2 is a conceptual UML (Unified Modelling Language) class diagram of the Object Store.

This simple UML diagram (not all fields are shown) represents the core Object Store tables. Its simplicity is apparent, but its flexibility may not be. It acts as a virtual database within a normal relational database management system (RDBMS), allowing a complex virtual schema to be contained within it.

The meta tables (prefixed with meta_) hold the metadata of the information model, i.e. they hold the data that fully describes the way the information model can be decomposed into various data objects. This is achieved by ensuring that each decomposed object is defined in terms of its content and how it relates to the other objects in the decomposition hierarchy. This definition describes both the structure of the object, namely its attributes and relationships, as well as its behaviour, namely the rules for creating and modifying the object.

In Object Oriented terms each of these definitions can be seen as Base Classes. For example, in the context of designing a web page in a web context the objects that may be defined are stories, images and so forth. Object Base Class definitions in the meta tables will be referred to as "the metadata" in this description where appropriate.

In the figures, PK denotes a primary key, i.e. a field or combination of fields whose values uniquely identify a row or record in the table. The primary key(s) will have a unique value for each record or row in the table. FK denotes a foreign key, i.e. a field or combination of fields in one table whose value(s) matches the primary key(s) in another table.

Table 1 describes the core meta database tables.

TABLE 1

| Table | Description |
| --- | --- |
| meta_item | The meta_item table holds the Base Class definitions of all Objects in the Object Store. For example, in a web context the Objects that may be defined are Stories, Images, etc.. This table primarily defines the Object's name and its position in the hierarchy of the defined Objects. This allows the decomposition of the aggregate information to be described in terms of the Object names and their hierarchical structure. There is the ability to link an Object to a parent Object. When a new Object is required, it is added to meta_item and, if required, linked to an appropriate parent. |
| meta_item_link | The meta_item_link table holds the definition of all relationships required between Objects defined in the Object Store. For example, in a web context it would be possible to link a Story to other related Stories according to a relationship defined in this table. This is achieved by inserting a link record between the relevant meta_item records. In this example the Story Base Class definition would be related back to itself. To allow a Story to relate other objects in the Object Store, a meta_item_link record would be created linking the Story Base Class to the Base Class definition of the relevant Object. |

TABLE 1-continued

| Table | Description |
| --- | --- |
| meta_field | The meta_field table is used to define attributes (fields) of an Base Class defined in meta_item. Thus, it is used to extend the Base Class attributes of an Object defined in meta_item, by adding additional attributes. For example, the text attribute for a Story Object would be defined in meta_field, as would a tape label attribute for a Tape Object. The Object Store API is designed to automatically retrieve all meta_field attributes for an Object. Every meta_field item (Object attribute) can be defined as mandatory, with a default value, etc. The data type can also be defined, e.g. integer, character, etc. |

The content tables (prefixed with c_) hold the actual organizational information itself. Using the web example above, these tables would contain the actual written stories themselves and the images that go with them.

In object oriented terms the content tables hold the instances of objects (i.e. the organisation's stories, images etc.) that inherit their structure and behaviour from their Base Classes as defined in the Meta Tables. Instances of the Object Base Classes that are stored in the content tables will be referred to as "instances" in this description where appropriate.

Table 2 describes the core content database tables.

TABLE 2

| Table | Description |
| --- | --- |
| c_item | Whereas meta_item defines the Object Base Class definition, c_item contains an instance of that Object Base Class definition. |
| c_item_link | This stores the relationships between Object instances for relationships defined in meta_item_link. |
| c_field | Object attributes are defined in meta_field with the actual values stored in c_field. In other words, the values in c_field are instances of the defined attributes. c_field attributes are linked to an Object instance in c_item. |

Thus, the meta tables are containers for serialization of a static class model, and the content tables are containers for serialization of simple object instances and their relationships.

One schema feature that is strongly encouraged by the Object Store is a hierarchical object structure. In a simple implementation, the Object Store provides a hierarchy for both classes and their object instances. Hierarchical design is becoming increasingly popular, particularly in databases supporting web sites, because of its expressiveness and flexibility. The model also allows for relationships to be created between objects.

As shown in FIG. 1, the Object Store is "wrapped" by the Object Store API (Application Program Interface). The API is a function call layer that manages the database access through a set of routines that, for example, call database stored procedures to insert, modify, retrieve, and delete Objects. This provides an efficient and simple method of accessing Objects in the Object Store by abstracting the complexity of the schema. To access the hierarchical object structure in the Object Store, stored procedures like the following are called through the Object Store API layer:

Get_Item
Get_Item_Children
Get_Item_Parent

The Object Store Tool is an application used by Object Store Administrators to define and update metadata, including object types, attributes and rules. Modifications to the metadata are immediately available for use and this application would usually only update the meta tables (prefixed with meta_).

Front end applications are those that would disseminate the content data to the end user, for example, a web site. These applications would usually access the content tables, and would also usually take advantage of the metadata defined in the meta tables describing the objects and attributes.

Back end applications are those necessary to maintain actual content information, i.e. instances of the objects, their attributes, relationships, etc. These applications would usually only update the content tables and would need knowledge of the metadata defined in the meta tables. With this knowledge it is possible to design a single tool that can generically manage all the content data in the Object Store through an understanding of the objects, their rules, relationships, field validation, default values, and so forth.

Using a traditional database solution, changes to the metadata, e.g. additional objects or attributes changes to the schema would normally result in database changes and changes to the back end applications. A system using the Object Store requires no changes to the database structure and few or no changes to these applications.

In an example of how the database system may be used, consideration will be given to adding a Story with some associated media to the Object Store. In this example, the following steps will be followed. Note that there is some flexibility in the order of the steps. The only constraint is that an object must be defined before it can be used, i.e. the object must have a base class definition in the meta tables.

Define a Story
Add an instance of a Story
Extend the definition of an Image
Add an instance of an Image
Define a relationship between an Image and a Story
Add an instance of a relationship between an Image and a Story In this example it is assumed that stories on a web site are grouped by subject area such as Education, Sport and so forth. In order to achieve this, it is decided that the system must hold at least the following data:

A subject with a title.
A story with a title and story text.
Knowledge of which subject the story belongs to.

Using a traditional database solution, it would be necessary to add two new tables to the database schema and a relationship between them. These changes to the schema would result in a knock on effect and would also require extensive changes to any database replication mechanism, the back end tools used to update the content data, and the front end tools which access this data, e.g. new stored procedures etc. Using the Object Store approach, there is no impact on the database schema at all. This is because changes to the existing data structure are defined in the metadata of the Object Store, and not in the database schema itself. The metadata of the Object Store represents the virtual schema A physical database schema does not exist and is derived purely from interpreting the metadata in the Object Store. This is where the rationale and advantages behind using the Object Store approach lies. As a result, there is no impact on any database replication mechanism that may be in place and there will be no (or very little changes) required to any generic back end applications that have been implemented either. The users will be able to immediately create and maintain stories within chosen subjects through their existing tools. Front end applications will benefit from the Object Store API and no additional functions to access this new data would need to be implemented.

Figure 3:
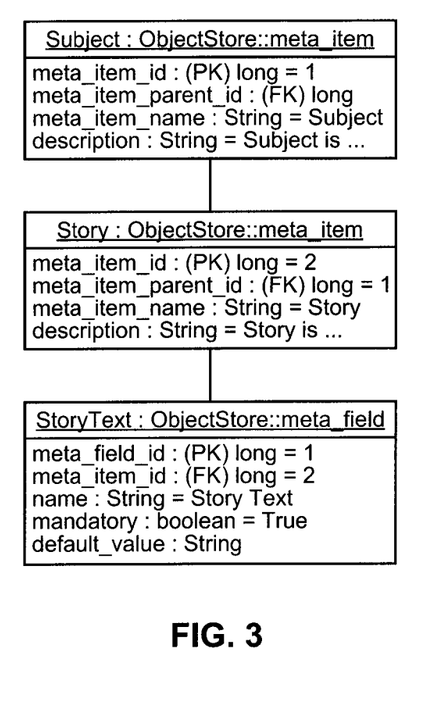
FIG. 3, is a class diagram of a story object in an object store.

To implement this structure using the Object Store, the metadata would be defined as shown in FIG. 3, which is a UML Class Diagram of the Story Object in the Object Store. Each meta_item has:
a unique id
a reference to the id of its parent in the hierarchy (for example the id of subject)
a name (e.g. Story)
an optional description The first meta_item is in respect of the subject, and the second is in respect of the story.

A Story Text field is defined in the meta_field table and this has:
a unique field id
a reference to the meta_item it is an attribute of
a name (e.g. Story Text)
additional information to assist the back end tool such as whether it is mandatory, has a default value etc.

It will be seen that setting up a hierarchy for stories, which are arranged under subject categories and themselves have associated objects such as text or images, requires no change to the database structure. In the meta_item table, two new records are made The first is for the subject object, and the second is for the story object. These are linked so that a story is organised under a subject. In the meta_field table, new entries are made for text and any other objects such as images.

Having defined a Story in the metadata of the Object store, it is now possible to add an instance of a Story, i.e. add an actual Story to the content tables of the Object Store, with story text and within a specific subject area.

Figure 4:
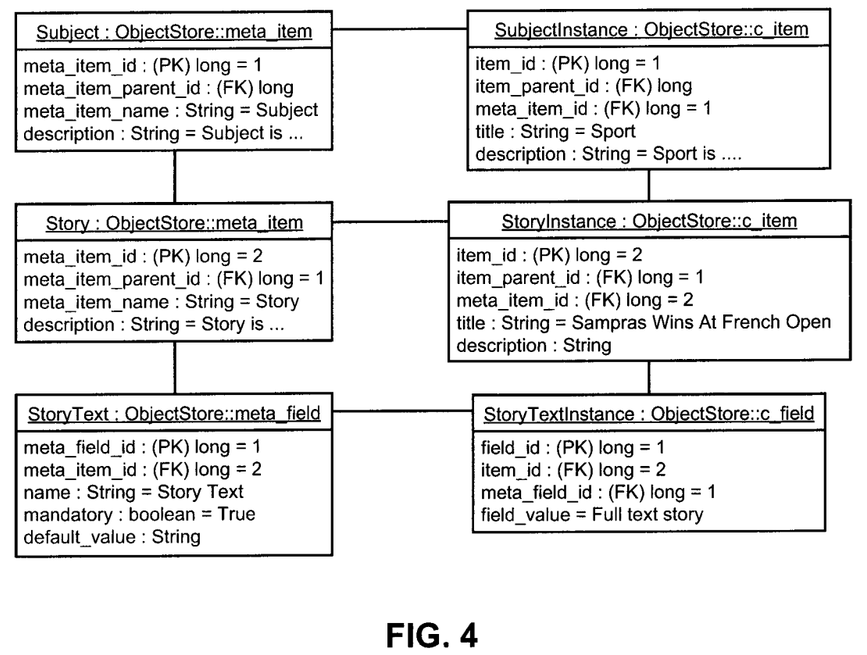
FIG. 4 is an instance diagram of a story object in an object store.

The UML Instance Diagram of the Story Object in the Object Store appears in FIG. 4. On the left are the metadata definitions i.e. Subject, Story, and Text and on the right the corresponding data in c_item and c_field. These establish that the subject is sport, that the story is "Sampras wins at French Open" and that there is a story text.

A further example concerns how to extend the definition of an Image. Assuming that there is a previously defined Image object in the Object Store which, for example, is also child of a Subject, this example shows how an additional field such as a caption could be added to the Image object. In object terms an additional attribute will be added to the Base Class of the Image Object.

Figure 5:
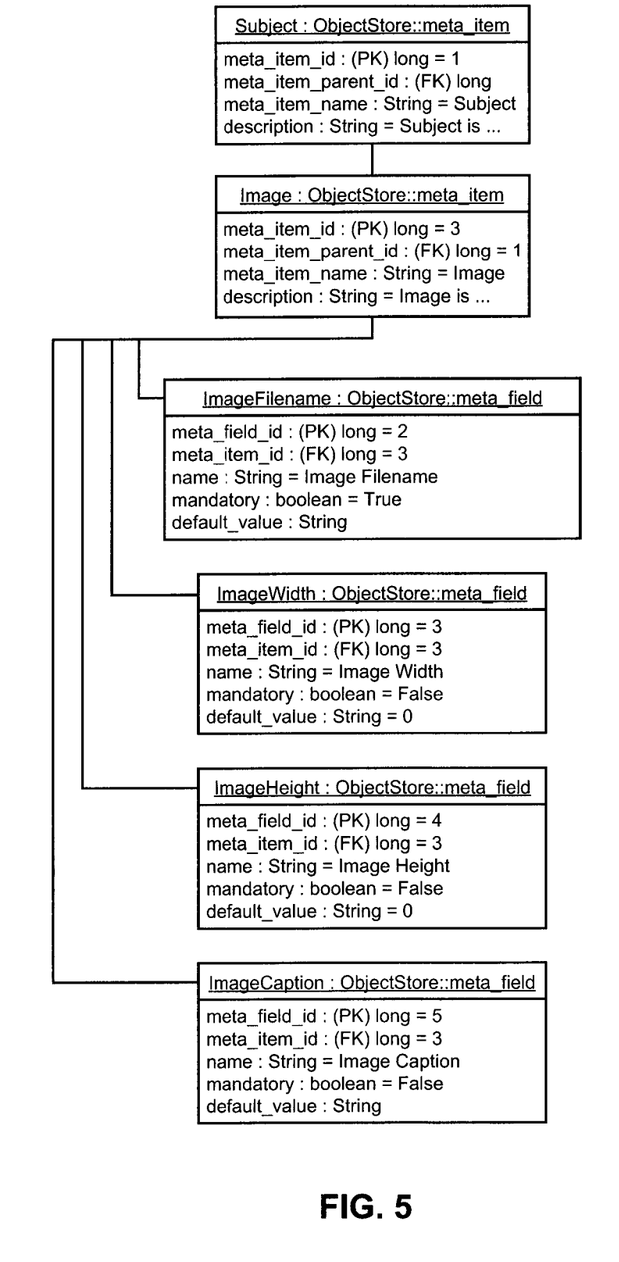
FIG. 5 is a class diagram of subject and image objects in an object store.

With a traditional solution it would be necessary to alter the physical database schema as well as attending to the resultant problems in any replication mechanism and interfaces. With the Object Store approach this field can be added "on the fly" with no changes required to any replication mechanism and very few (if any changes) required in the interfaces. FIG. 5 is a UML Class Diagram of the Subject and Image Objects in the Object Store with a caption field, and other fields, linked to the Image Object. This shows how the Image meta_item is linked under the Subject meta_item. To accommodate various attributes of an image, additional fields have been defined in the meta_field table. They are for the image filename (i.e. where the image file can be located), the image width and height, and the image caption. If previously an image caption had not existed, it would simply be necessary to add a new record in the meta_field table.

Figure 6:
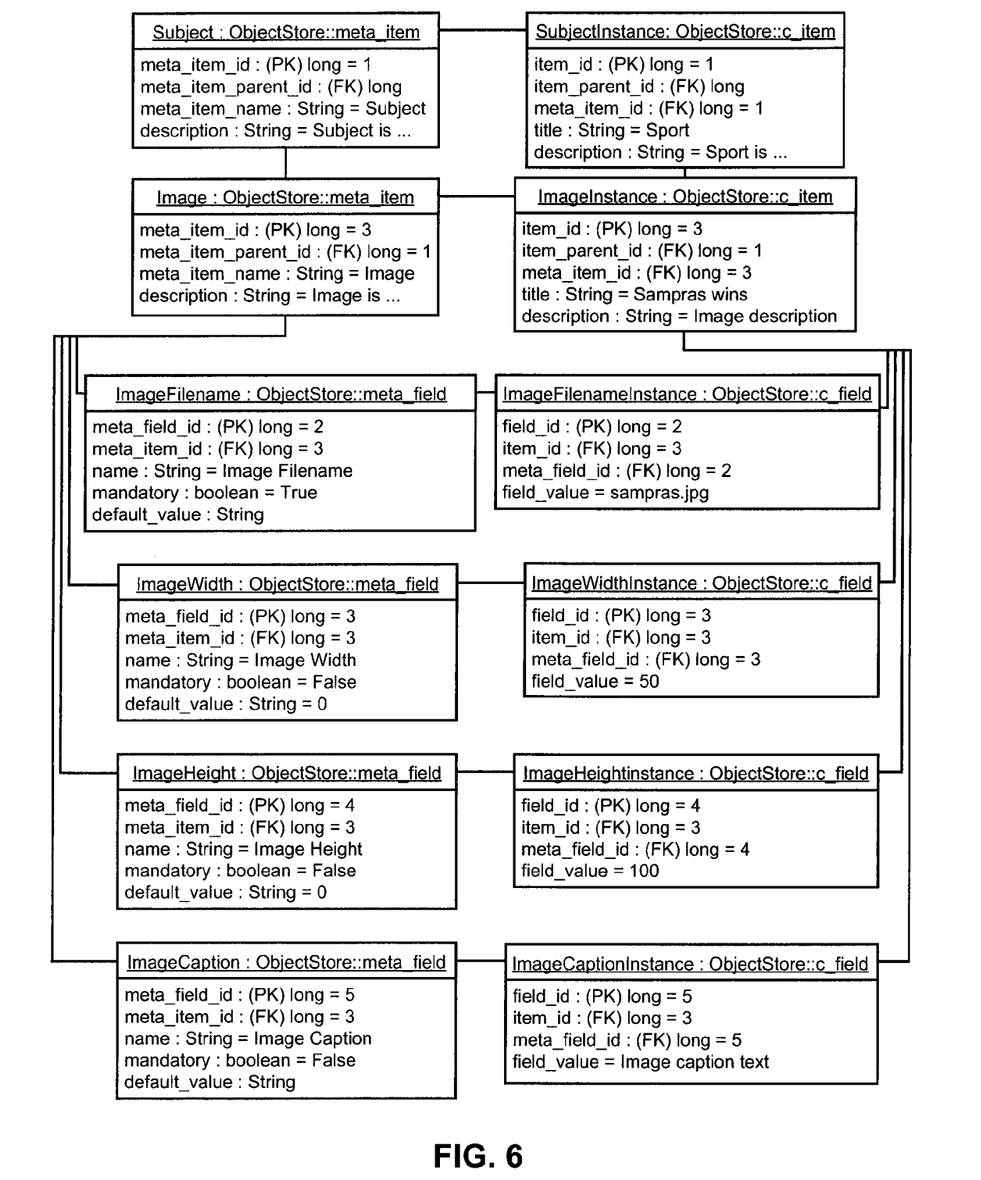
FIG. 6 is a class diagram of the base classes and instances for images with attributes.

To add an image, or to update its data if for example a caption has been added, data is added to the content tables. The resultant arrangement is shown in FIG. 6 which is the UML Class Diagram of the Base Classes and instances of these. On the left are the metadata definitions for an Image and on the right the actual Image data as stored in c_item and c_field. In this case, data is stored showing that under the subject Sport, there is an image called "Sampras Wins". The file in this instance is "sampras.jpg", with a width of 50, a height of 100 and a caption which for the purposes of this example is given as "Image caption text".

To be able to create a relationship between an Image and a Story, with a traditional database approach unless such a relationship was already part of the schema it would be necessary to alter the physical database schema and attend to all the problems that would result in the replication and back end tools. With the Object Store approach this relationship is defined in the meta_item_link table of the Object Store and results in minimal impact on surrounding systems.

Figure 7:
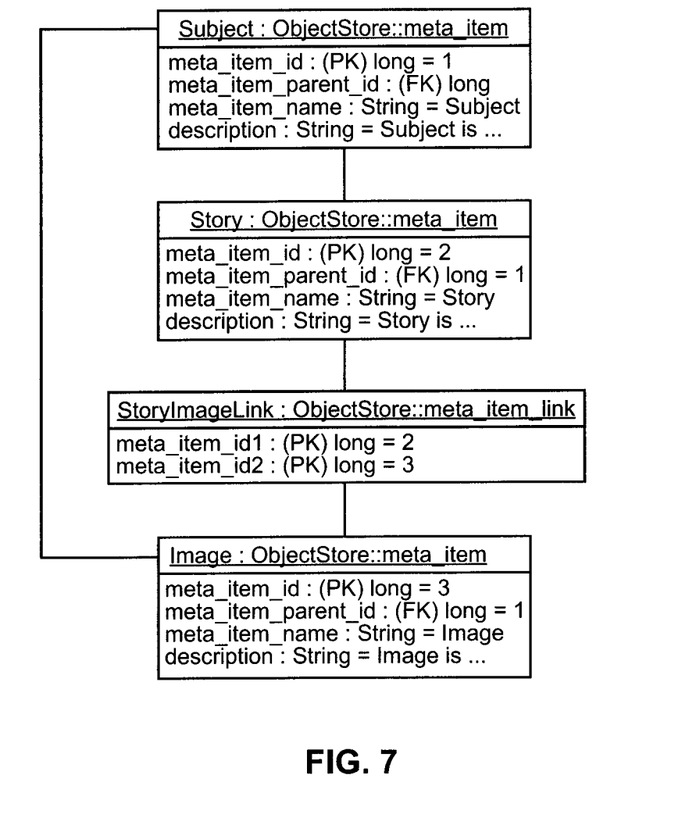
FIG. 7 is an example of a class diagram of subject, story, and image objects in an object store.
Figure 8:
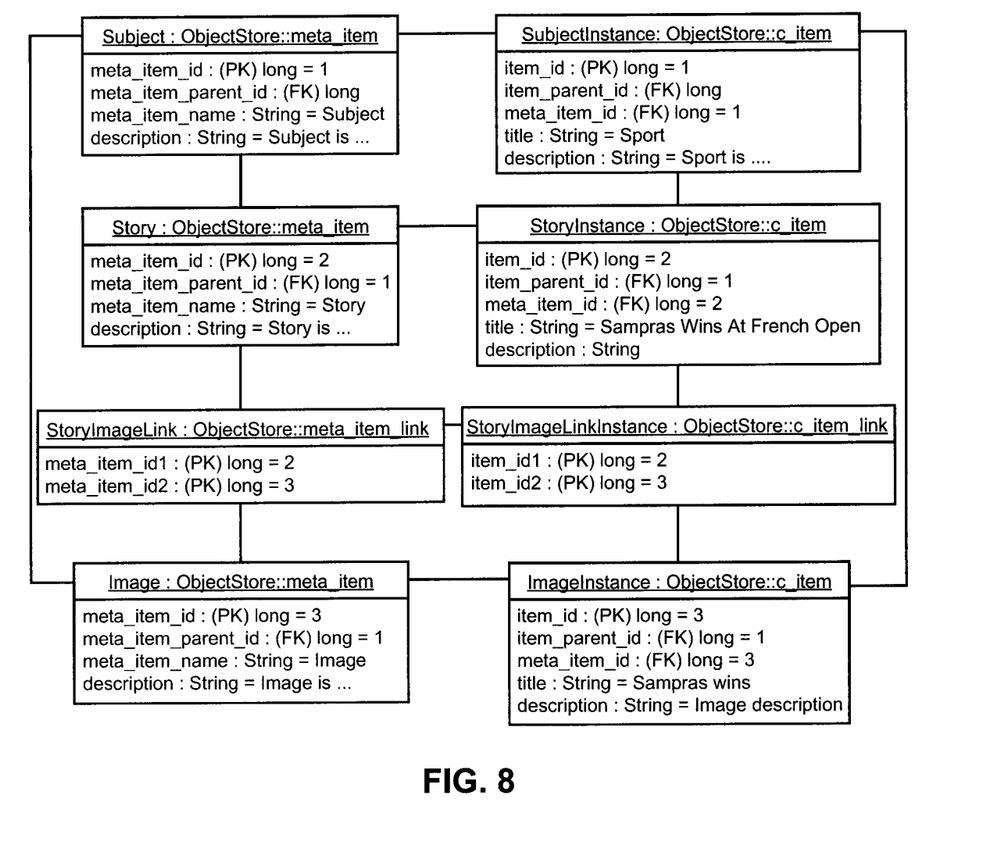
FIG. 8 is an instance diagram showing the relationship between a story and an image.

FIG. 7 is an example of UML Class Diagram of the Subject, Story, and Image Objects in the Object Store with a relationship between a Story and an Image. In the meta_item_link table a new entry has been made, linking the Story and Image meta_items by their id's. Having fully defined a Story and an Image, and defined a relationship between the two in the Object Store, it is now possible to create a relationship between an actual story and an image by adding a c_item_link record. FIG. 8 is the UML Instance Diagram showing the added relationship between the Story and the Image. Thus, the "Sampras Wins" image is not only linked to the Sport subject but also to the specific story "Sampras Wins at French Open".

A further example concerns handling data feed, i.e. the importation of data from various sources for the creation of e.g. a web page. The overall requirement is to import data from various organisations via various mechanisms and in varying formats, to process the data, and to store it in the database in a predefined format. For this there would preferably be a generic Import Engine which would be able to handle the diverse formats from the various organisations in a flexible and data driven way. It would be necessary to hold information relating to:
the provider of the data
the source parameters of the data
the format of the data
the output format required
the data import and manipulation process to be used
the frequency of the required import
and finally to store the imported data related to the source.

Figure 9:
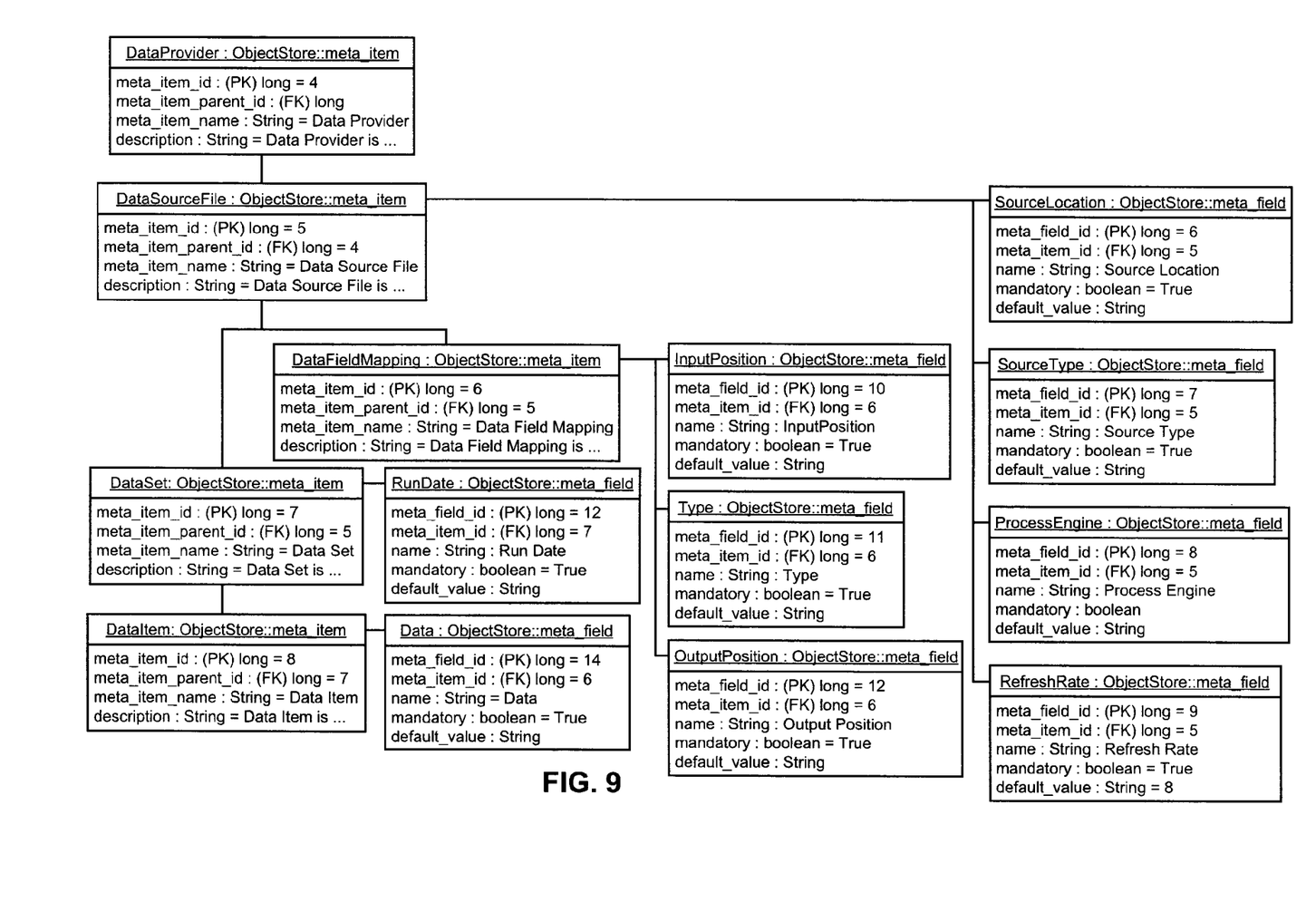
FIG. 9 is a class diagram of data feed objects.

FIG. 9 is the UML Class Diagram of the Data Feed Objects in the Object Store.

As will be seen, arranged under "Data Provider" is the Data Source File object. This is linked to four meta_field records for location, type, process engine and refresh rate. It is also linked to the data field mapping meta_item, which is itself linked to meta_field records for input position, type and output position. The Data Source File object is also linked to the DataSet meta_item. This is linked to a meta_field record for Run Date, and to a meta_item DataItem which is linked to a meta_field for Data. The DataSet object is used as a "folder" object as a container for other data objects. This additional structure would be beneficial in a generic back end tool in order to group the data and simplify the user's view of the data in the user interface.

In a practical embodiment, further data tables will be required. For example, the following tables may be used.
S_USER—Contains a list of all the users including their name, network login name, department, etc.
S_USER_GROUPS—Contains a list of all user groups, such as User, Administrator, Sub-Editor, etc.
SL_USERGRP—Links a user with a user group.

S_APPLICATION—Contains a list of all the applications used and the code that needs to be run when the application loads, such as File Manager, User Manager, Copyright, etc.

SL_APP_USERGRP—Links a user group with an application.

G_SYSTEM_SETTINGS—Used to store certain constants, such as where the system stores real media files, etc.

META_ITEM—As explained above, this is a core system table. Everything in the system has an associated meta item. A story has meta item and so does a video, and folders are meta items as are categories.

META_FIELD—This is also a core system table. Typically a meta item will require fields to be collected for it. These are done by adding a meta field which links back to the meta item. In a story the text is stored in a field that is defined for the meta item of a story in a meta field. Videos have fields such as sub title, duration, etc. The way the system is arranged, it is possible to simply add a field to a meta item and the code will automatically pick this up and allow users to gather information on it. For each meta field it is possible to define whether it is mandatory, give it a default value, maximum width, etc. It is also possible to define what type it is, integer, character, etc and how its control type should be displayed on a screen including which tab (page) it should be shown on.

META_CONTROL_TYPE—This contains a list of meta control type that can be given to a meta item. For each of these control types there is some code stored that gets executed when the field is displayed. This code is written once and can be used on any meta field. Every meta field has a control type. This defines how it is displayed and what checks are done on it. Control types include Text Field, Hidden, to more complicated control types such as drag and drop, duration, combo box, drag drop video, upload and preview. This means that there is the ability to add a new meta field to a meta item with a certain meta control type that will allow users to upload videos, or use a drag and drop crop thumbnail image without it being necessary to write a single line of new code.

META_FIELD_TYPE—Contains a list of what type of data is being collected, such as text, numeric, etc.

META_ITEM_PAGE—Every meta item field is given a meta item page. This tells the system which page (tab) the field should be shown on. For example it could be decided that a thumbnail on a video is displayed on the third tab. Stored in the page is which graphic to display for the tab, and its width.

META_ACTION—Every meta item can have zero or more actions (add, copy, delete, etc). These are added to each meta item allowing an administrator to define what users are allowed to do on each item.

META_ITEM_LINK—There is the ability to link a meta item to another meta item. This allows the system to relate a meta item, giving a one to many relationship. If a meta item is related back to the original meta item or to itself it is possible to have a many to many relationship. For example, a Web Block could be linked (related) to itself, Polls, URL Links, and Forums.

SL_ACTION_USERGRP—Links a meta action to a user group. For example, only certain groups can delete certain assets C_ITEM—As explained above, this is a core system table. The meta_item table defines the data collected and the c_item table stores the actual data. For instance every video, story, category, image, running order, script, etc has a c_item record. This gives it an item id, title, description, copyright information, when it was created, modified, etc. Stored in every c_item record is the meta_item id so that it is known from looking at an item that it is a web block, video, category, etc. It also stores the item id of the parent c_item so that it is known that a story belongs to a particular web block, etc.

C_FIELD—This is also a core system table. Whereas the c_item table stores the data defined in the meta_item table, stored in the c_field table is the data that is defined in the meta_field table. The c_field record is linked to the c_item.

C_ITEM_LINK—This stores the actual links between the items as defined in the meta_item_link table. For example, the meta_item_link table will enable a user to link stories together.

It will thus be seen that the Object Store is a simple, powerful and flexible way to store complex data. It is particularly suitable to applications that utilize object-oriented techniques in the middle-tier, when the database is replicated and when rapid development is required. The data model employed by the Object Store is flexible and yet powerful. Applications built on top of the Object Store can be developed very quickly and faster than is possible if a conventional database schema is adopted.

To add a new type of object to a conventional relational database, a new table would need to be added to the database schema. Applications harnessing the power of the Object Store only need to add a new object to the meta tables using the Object Store Tool. For an application that requires new objects to be added regularly, this provides an extremely flexible, extensible method of extending the system. When an object is added to the Object Store, database replication moves the virtual schema changes as data to remote sites without administrative intervention.

The invention claimed is:

1. An apparatus for managing data objects, the apparatus comprising:
a memory configured to store a meta table and a content table, the meta table including metadata records,
wherein the content table specifies an instance of each of the data objects, each of the instances being linked to a metadata record stored in the meta table and including a parameter associated with the metadata record,
wherein the content table further specifies relationships between the instances,
wherein the meta table specifies definitions for subsets of the data objects and hierarchical relationships between the subsets of the data objects.

2. An apparatus according to claim 1, wherein each of the metadata records specifies an object type.

3. An apparatus according to claim 2, wherein the object type includes a subject and a story.

4. An apparatus according to claim 2, wherein the object type identifies a media content.

5. An apparatus according to claim 4, wherein the media content includes textual information, visual information, or audio information.

6. An apparatus according to claim 4, wherein the media content includes a web page, a broadcast or a publication.

7. An apparatus according to claim 1, wherein each of the metadata records includes an attribute that specifies one of a permission right, a version, an available format, or a description.

8. An apparatus according to claim 1, wherein each of the metadata records specifies a hierarchical relationship of the data objects.

9. An apparatus according to claim 1, wherein each of the metadata records includes a behavior that specifies a rule for creating and modifying the data objects.

10. An apparatus according to claim 1, wherein the data objects include a file object specifying a provider of the file object, a source parameter of the file object, a format of the file object, data import and manipulation processes of the file object, and refresh rate of the file object.

11. An apparatus according to claim 1, further comprising:
an interface coupled to the memory, wherein the interface is configured to provide retrieval of values of attributes for one of the instances for presentation of relationship information between one of the data objects and remaining ones of the data objects in a hierarchical structure.

12. A method for managing data objects, the method comprising:
storing a meta table, wherein the meta table includes metadata records; and
storing a content table that specifies an instance of each of the data objects, each of the instance being linked to a metadata record stored in the meta table and including a parameter associated with the metadata record,
wherein the content table further specifies relationships between the instances,
wherein the meta table specifies definitions for subsets of the data objects and hierarchical relationships between the subsets of the data objects.

13. A method according to claim 12, wherein each of the metadata records specifies an object type.

14. A method according to claim 13, wherein the object type includes a subject and a story.

15. A method according to claim 12, wherein each of the metadata records includes an attribute that specifies one of a permission right, a version, an available format, or a description.

16. A method according to claim 12, wherein each of the metadata records specifies a hierarchical relationship of the data objects.

17. A method according to claim 12, wherein each of the metadata records includes a behavior that specifies a rule for creating and modifying the data objects.

18. A method according to claim 12, wherein the meta table includes a user group, a user group application, a system setting, a meta control type, or a meta action table specifying behavior of the data objects.

19. A method according to claim 12, wherein the data objects include a file object specifying a provider of the file object, a source parameter of the file object, a format of the file object, data import and manipulation processes of the file object, and refresh rate of the file object.

20. A method according to claim 12, further comprising:
permitting retrieval of values of attributes for one of the instances for presentation of relationship information between one of the data objects and remaining ones of the data objects in a hierarchical structure.

21. A method according to claim 12, further comprising:
storing a folder object as a virtual container for the data objects.

22. A method according to claim 12, wherein the meta table includes a meta item table including definitions for each of the data objects and a position of each of the data objects in hierarchical relationships.

23. A system comprising:
a database configured to permit update of a metadata record in a meta table, wherein the database is configured to store the meta table and a content table that includes a plurality of data objects,
wherein an instance for one of the data objects is updated, wherein the instance includes a link to the metadata record, the instance including a parameter associated with the metadata record,
wherein the database is further configured to store a content link table defining relationships between the instances, and to store a meta link table defining hierarchical relationships between a first subset of the data objects and a second subset of the data objects.

24. A system according to claim 23, wherein the instance includes a reference to media content data.

* * * * *